United States Patent
Hwang et al.

(10) Patent No.: US 11,146,354 B2
(45) Date of Patent: Oct. 12, 2021

(54) METHOD FOR PERFORMING CHANNEL-CODING OF INFORMATION ON BASIS OF POLAR CODE

(71) Applicant: LG ELECTRONICS INC., Seoul (KR)

(72) Inventors: Seunggye Hwang, Seoul (KR); Bonghoe Kim, Seoul (KR); Joonkui Ahn, Seoul (KR); Yunjung Yi, Seoul (KR); Kijun Kim, Seoul (KR)

(73) Assignee: LG ELECTRONICS, INC, Seoul (KR)

( * ) Notice: Subject to any disclaimer, the term of this patent is extended or adjusted under 35 U.S.C. 154(b) by 0 days.

(21) Appl. No.: 16/476,029

(22) PCT Filed: Jan. 5, 2018

(86) PCT No.: PCT/KR2018/000245
§ 371 (c)(1),
(2) Date: Jul. 3, 2019

(87) PCT Pub. No.: WO2018/128457
PCT Pub. Date: Jul. 12, 2018

(65) Prior Publication Data
US 2019/0379486 A1    Dec. 12, 2019

Related U.S. Application Data

(60) Provisional application No. 62/442,965, filed on Jan. 5, 2017.

(51) Int. Cl.
*H04W 40/00* (2009.01)
*H04B 14/00* (2006.01)
(Continued)

(52) U.S. Cl.
CPC .......... *H04L 1/0057* (2013.01); *H04L 1/0041* (2013.01); *H04L 1/0047* (2013.01)

(58) Field of Classification Search
CPC ... H04L 1/0057; H04L 1/0041; H04L 1/0047; H04L 1/0072; H04W 72/042;
(Continued)

(56) References Cited

U.S. PATENT DOCUMENTS 8,223,734 B2 * 7/2012 Han ................ H04B 7/0413
370/342
10,312,947 B2 * 6/2019 Ge .................... H03M 13/13
(Continued)

FOREIGN PATENT DOCUMENTS

KR         101301368       8/2013
KR       1020150009474     1/2015
(Continued)

OTHER PUBLICATIONS

Huawei, HiSilicon, "HARQ scheme for polar codes," 3GPP TSG-RAN WG1 #87, R1-1611255, Nov. 2016, 25 pages (Year: 2016).*
(Continued)

*Primary Examiner* — Edan Orgad
*Assistant Examiner* — Vanneilian Lalchinthang
(74) *Attorney, Agent, or Firm* — Lee, Hong, Degerman, Kang & Waimey

(57) ABSTRACT

A disclosure of the present specification provides a method for performing channel-coding of information on the basis of polar code. The method comprises the steps of: performing the channel-coding of first input information and second input information by using a generator matrix for the polar code; and transmitting first output information and second output information generated as a result of the channel-coding, wherein the first output information may be generated using only the first input information, and the second
(Continued)

output information may be generated using both the first output information and the second input information.

7 Claims, 14 Drawing Sheets

(51) Int. Cl.
  *G06F 11/10* (2006.01)
  *H04L 1/00* (2006.01)
(58) Field of Classification Search
  CPC ....... H04W 16/32; H04B 14/008; H04B 1/04; H03M 13/3972; H03M 13/09
  USPC .......................................................... 370/329
  See application file for complete search history.

(56) References Cited

U.S. PATENT DOCUMENTS

| | | | | |
|---|---|---|---|---|
| 10,476,634 | B2* | 11/2019 | Ge | H03M 13/096 |
| 2011/0105162 | A1* | 5/2011 | Kim | H04L 5/0035 |
| | | | | 455/500 |
| 2015/0063152 | A1* | 3/2015 | Chiang | H04L 41/14 |
| | | | | 370/252 |
| 2015/0103947 | A1* | 4/2015 | Shen | H03M 13/13 |
| | | | | 375/295 |
| 2016/0013887 | A1* | 1/2016 | Shen | H04L 1/0045 |
| | | | | 375/295 |
| 2016/0374060 | A1* | 12/2016 | Lim | H04W 72/042 |
| 2017/0012744 | A1* | 1/2017 | Shen | H04L 1/0041 |
| 2017/0288936 | A1* | 10/2017 | Park | H04L 27/32 |
| 2018/0226999 | A1* | 8/2018 | Wang | H03M 13/2792 |
| 2018/0337753 | A1* | 11/2018 | Yao | H04L 1/08 |
| 2018/0351579 | A1* | 12/2018 | Hong | H03M 13/13 |
| 2018/0368024 | A1* | 12/2018 | Cheng | H04L 5/14 |

FOREIGN PATENT DOCUMENTS

| | | |
|---|---|---|
| KR | 1020160074076 | 6/2016 |
| KR | 1020160150610 | 12/2016 |

OTHER PUBLICATIONS

PCT International Application No. PCT/KR2018/000245, International Search Report dated Jul. 12, 2018, 6 pages.
Huawei, HiSilicon, "HARQ scheme for polar codes," 3GPP TSG-RAN WG1 #87, R1-1611255, Nov. 2016, 25 pages.
MediaTek Inc., "On 2-stage Downlink Control Infomation for NR," 3GPP TSG-RAN WG1 #87, R1-1612121, Nov. 2016, 5 pages.
European Patent Office Application Serial No. 18736372.6, Search Report dated Aug. 6, 2020, 7 pages.

* cited by examiner

METHOD FOR PERFORMING CHANNEL-CODING OF INFORMATION ON BASIS OF POLAR CODE

CROSS-REFERENCE TO RELATED APPLICATIONS

This application is the National Stage filing under 35 U.S.C. 371 of International Application No. PCT/KR2018/000245, filed on Jan. 5, 2018, which claims the benefit of U.S. Provisional Application No. 62/442,965, filed on Jan. 5, 2017, the contents of which are hereby incorporated by reference herein in its entirety.

BACKGROUND OF THE INVENTION

Field of the Invention

The disclosure relates to a method of performing channel coding on control information on the basis of a polar code and, more particularly, to a method of configuring a generator matrix for performing channel coding on one or more pieces of downlink control information (DCI) and performing encoding and decoding using the same in the case where a next-generation new radio access technology (new RAT) employs a polar code as a channel coding scheme.

Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

It is anticipated that in the next generation mobile communication, that is, the 5th generation mobile communication, data service with minimum speed of 1 Gbps is expected to be realized.

Turbo codes, polar codes, and LDPC codes are considered as channel coding techniques in the 5th generation mobile communication.

SUMMARY OF THE INVENTION

One aspect of the disclosure is to configure a generator matrix for performing channel coding on one or more pieces of downlink control information (DCI) and to perform encoding and decoding using the same.

To achieve the foregoing aspect, one embodiment of the disclosure provides a method for performing channel coding on information on basis of a polar code. The method may include: performing channel coding on first input information and second input information using a generator matrix for a polar code; and transmitting first output information and second output information generated as a result of the channel coding, wherein the first output information may be generated using only the first input information, and the second output information may be generated using both the first output information and the second input information.

The performing of the channel coding may include additionally performing channel coding on third input information using the generator matrix, and generating third output information using the first output information and the third input information.

The transmitting may include transmitting the first output information and the second output information to a first terminal and transmitting the first output information and the third output information to a second terminal, and the first output information may be transmitted to the first terminal and the second terminal in common.

The aggregation level of the first output information and the aggregation level of the second output information may be determined in view of a channel condition of the first terminal, the aggregation level of the first output information and the aggregation level of the third output information may be determined in view of a channel condition of the second terminal, and the aggregation level of the first output information may be determined on the basis of a channel condition of a terminal having a poor channel condition among the first terminal and the second terminal.

The performing of the channel coding may include encoding the first input information using a first polar code encoder and encoding the second input information using a second polar code encoder.

When the first polar code encoder and the second polar code encoder have different sizes, the second output information may be generate by changing the size of the first output information to the size of the second polar code encoder.

When the first polar code encoder and the second polar code encoder have the same size, the second output information may be generated using the first output information and the second input information without size matching.

The generator matrix may be generated using a Kronecker product of a kernel matrix.

The size and the position of an unfrozen bit may be determined on the basis of the size of the first input information and the size of the second input information.

To achieve the foregoing aspect, another embodiment of the disclosure provides a transmission device for performing channel coding on information on basis of a polar code. The transmission device may include: a transceiver configured to transmit first output information and second output information generated as a result of channel coding; and a processor configured to control the transceiver, wherein the processor may perform channel coding on first input information and second input information using a generator matrix for a polar code, the first output information may be generated using only the first input information, and the second output information may be generated using both the first output information and the second input information.

To achieve the foregoing aspect, still another embodiment of the disclosure provides a reception device for decoding information on basis of a polar code. The reception device may include: a transceiver configured to receive first output information and second output information which are channel-coded using a generator matrix for a polar code; and a processor configured to control the transceiver, wherein the processor may obtain first input information using the first output information and may obtain second input information using both the first output information and the second output information.

According to one aspect of the disclosure, different terminals may share DCI, which is common information, thereby reducing complexity that occurs in blind decoding.

DESCRIPTION OF EXEMPLARY EMBODIMENTS

Figure 1:
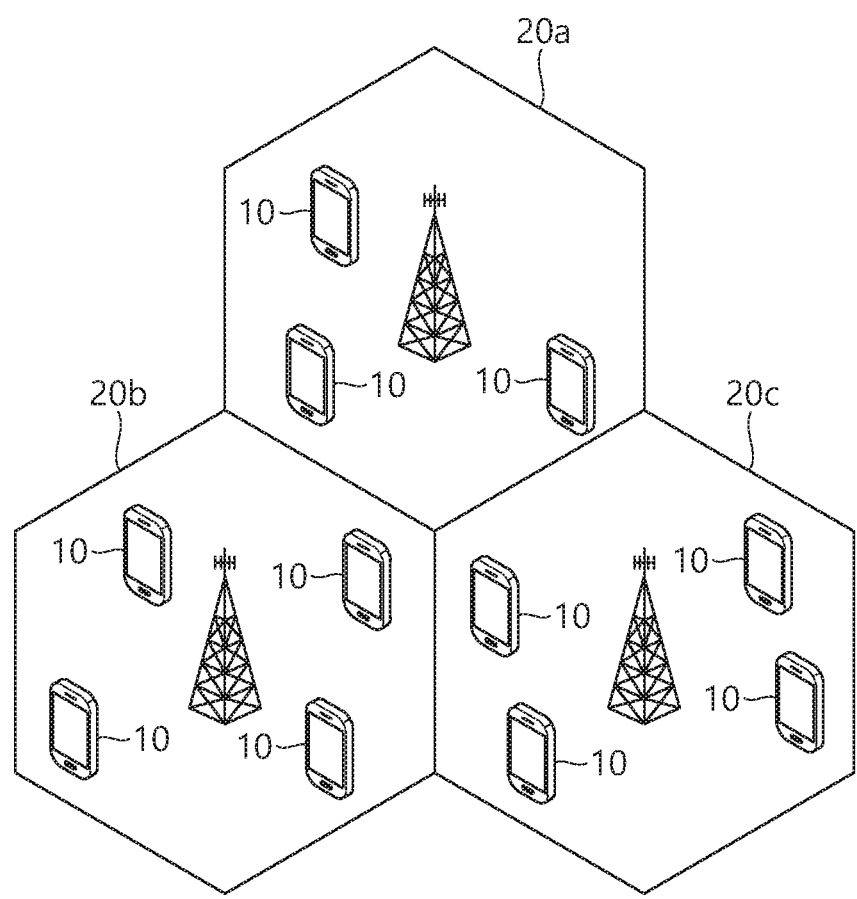
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

Referring to FIG. 1, the wireless communication system includes at least one base station (BS) 20. Respective BSs 20 provide a communication service to particular geographical areas 20*a*, 20*b*, and 20*c* (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
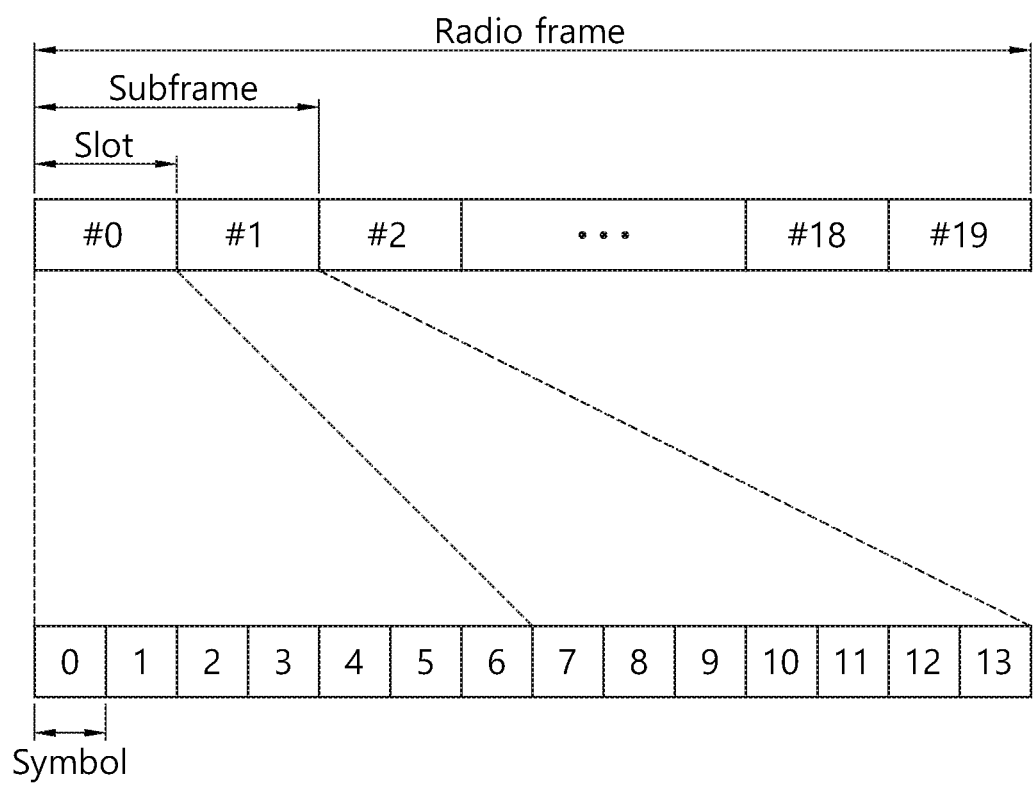
FIG. 2 shows a downlink radio frame structure according to FDD of 3rd generation partnership project (3GPP) long term evolution (LTE).

FIG. 2 shows a downlink radio frame structure according to FDD of 3rd generation partnership project (3GPP) long term evolution (LTE).

Referring to FIG. 2, the radio frame includes 10 subframes. One subframe includes two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

One slot includes $N_{RB}$ resource blocks (RBs) in the frequency domain. For example, in an LTE system, the number of RBs, which is $N_{RB}$, may be one of 6 to 110.

An RB is a resource allocation unit, and one slot includes a plurality of subcarriers. For example, if one slot includes seven OFDM symbols in the time domain, and an RB includes 12 subcarriers in the frequency domain, one RB may include 7×12 resource elements (REs).

Next-Generation Mobile Communication Network

With the successful commercialization of mobile communication based on 4G LTE/International Mobile Communications (IMT) standards, studies are being conducted on next-generation mobile communication (5G mobile communication). 5G mobile communication systems are aimed at providing higher capacity than current 4G LTE systems, may increase the density of mobile broadband users, and may support device-to-device (D2D) communication, high stability, and machine-type communication (MTC). Studies on 5G are aimed at reducing latency and reducing battery consumption, compared to 4G mobile communication systems, in order to realize the Internet of Things. For 5G mobile communication, a new radio access technology (new RAT or NR) may be proposed.

In the NR, it is considered to use a downlink subframe for reception from a base station, and to use an uplink subframe for transmission to a base station. This method may be applied to a pair of spectrums and to an unpaired spectrum. One pair of spectra indicates that two subcarrier spectra are included for downlink and uplink operations. For example, in one pair of spectra, one subcarrier may include a downlink band and an uplink band that are paired with each other.

Figure 3:
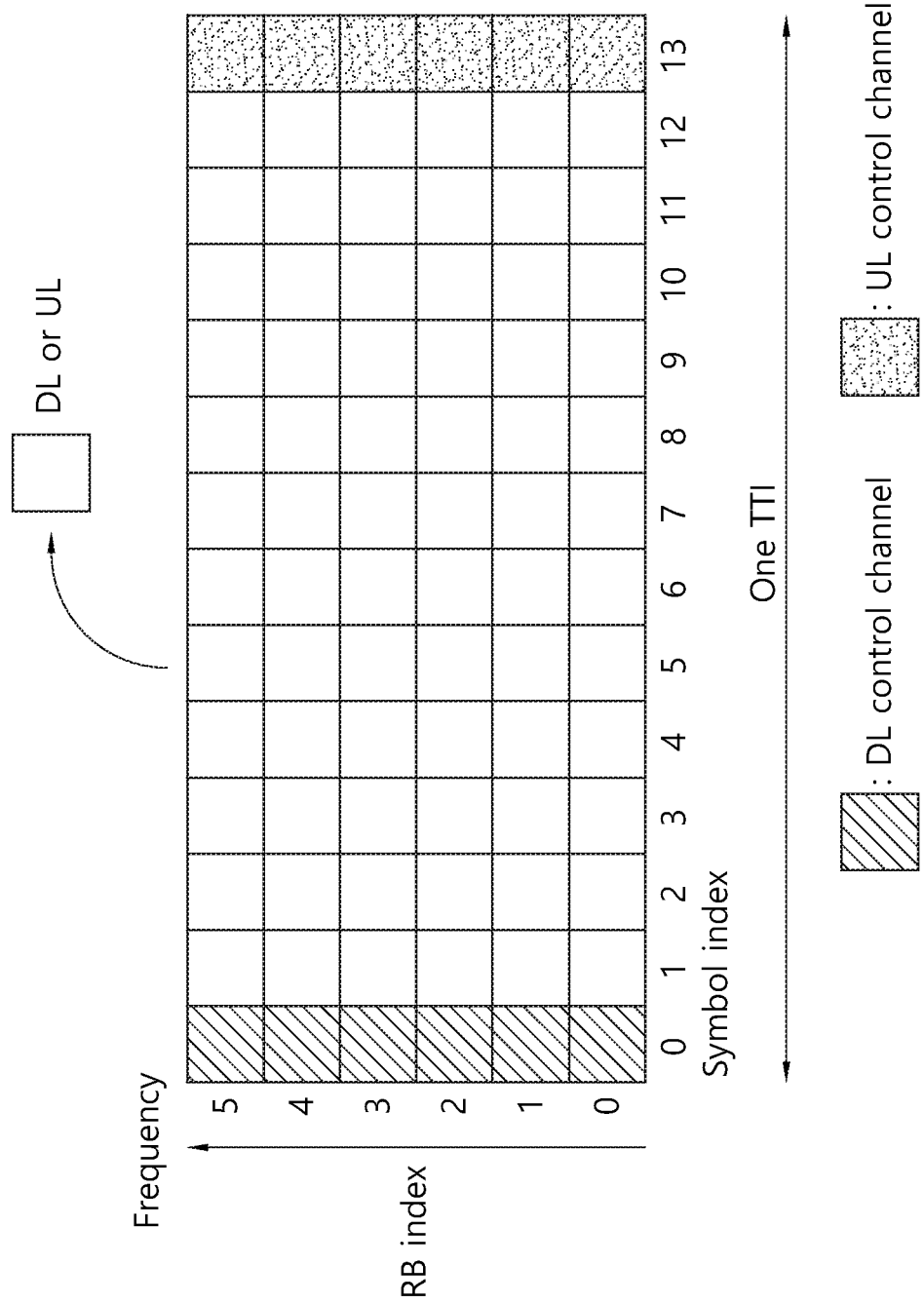
FIG. 3 illustrates an example of a subframe type in the NR.

FIG. 3 illustrates an example of a subframe type in the NR.

A time transmission interval (TTI) illustrated in FIG. 3 may be referred to as a subframe or slot for the NR (or new RAT). In FIG. 3, a subframe (or slot) may be used for a TDD system of the NR (or new RAT) in order to minimize a delay in data transmission. As illustrated in FIG. 3, a subframe (or slot) includes 14 symbols as in a current subframe. A front symbol of the subframe (or slot) may be used for a downlink (DL) control channel, and a rear symbol of the subframe (or slot) may be used for an uplink (UL) control channel Remaining symbols may be used for downlink data transmission or uplink data transmission. According to this subframe (or slot) structure, downlink transmission and uplink transmission may be sequentially performed in one subframe (or slot). Thus, downlink data may be received in a subframe (or slot), and an uplink acknowledgement (ACK/NACK) may be transmitted in the subframe (or slot). This subframe (or slot) structure may be referred to as a self-contained subframe (or slot). Using this subframe (or slot) structure makes it possible to reduce time to retransmit data having failed to be received, thus ultimately minimizing final latency in data transmission. In this self-contained subframe (or slot) structure, a time gap may be required for a transition from a transmission mode to a reception mode or from the reception mode to the transmission mode. To this end, some OFDM symbols for a transition from a downlink to an uplink in the subframe structure may be configured as a guard period (GP).

Requirements of 5G systems may include latency, peak data rate, error correction, and the like. 5G, which is expected to be used not only for mobile communication services but also for ultra-high-resolution media streaming, the Internet of Things, cloud computing, autonomous vehicles, is aimed at providing much higher performance in different fields than that required by LTE systems.

5G is aimed at achieving a latency of 1 ms, which is 1/10 of LTE latency. This short latency is an important index in areas associated with human life, such as autonomous vehicles. 5G is also aimed at providing a high data rate. 5G is expected to sufficiently provide high-capacity ultrahigh-speed communication, such as a high-quality media streaming service, at a peak data rate 20 times faster than LTE and a perceptible data rate 10 to 100 times faster than LTE. An error correction capability reduces data retransmission rate, thus ultimately reducing latency and improving data rate.

A polar code, a low-density parity-check (LDPC) code, and the like are considered as a 5G channel coding scheme.

An LDPC code is based on the characteristics of an iterative LDPC decoding scheme in which as the length of a code is increased, error correction capability per bit is improved but complexity in computation per bit is maintained. Further, it is possible to design a code in order to perform decoding operations in parallel, making it possible to decode a long code at a high speed.

Next, a polar code is the first error correction code that has low encoding and decoding complexity and is theoretically proved to achieve channel capacity for ordinary symmetric binary-input discrete memoryless channels. Contrary to an LDPC code and a turbo code using a recursive decoding process, a polar code uses successive cancelation (SC) decoding and list decoding in combination. Further, unlike an LDPC code that uses parallel processing to improve performance, a polar code employs pipelining to improve performance.

Figure 4A:
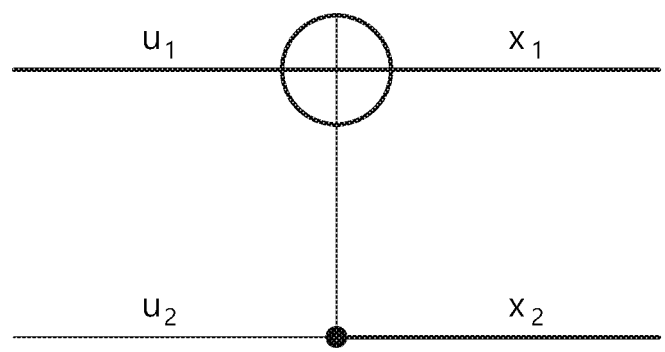
FIG. 4A illustrates the basic concept of a polar code.
Figure 4B:
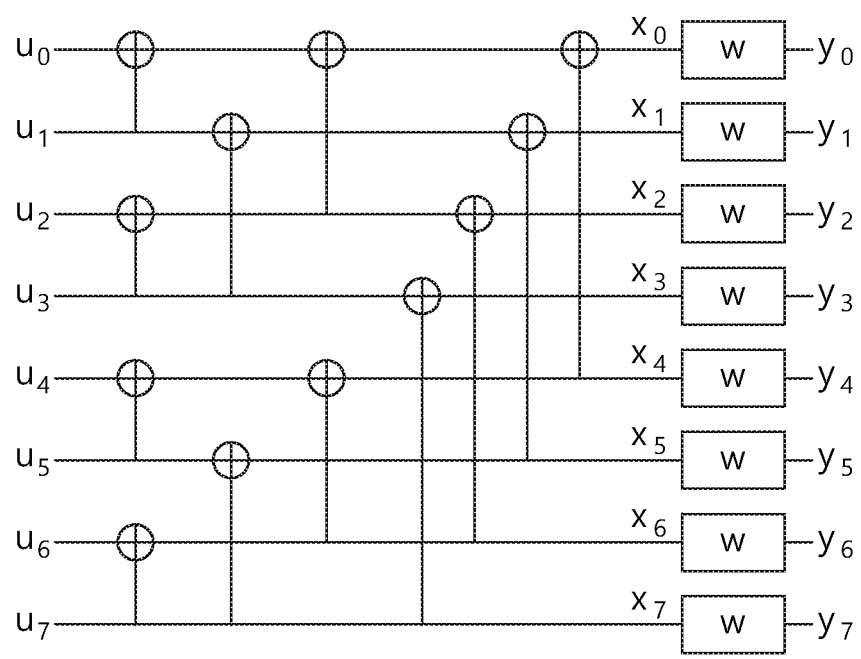
FIG. 4B illustrates the structure of an SC decoder.

FIG. 4A illustrates the basic concept of a polar code, and FIG. 4B illustrates the structure of an SC decoder.

Referring to FIG. 4A, different inputs u1 and u2 go through different channels, thus resulting in different outputs x1 and x2. Here, it is assumed that input u2 passes through a relatively good channel, and u1 passes through a relatively poor channel, where a channel means the impact of an encoder. When this structure of FIG. 4A is repeated, u2 passing through the good channel gets better, and u1 passing through the poor channel gets worse, thus resulting in the structure in FIG. 4B. This is called polarization.

The structure illustrated in FIG. 4B may be generated by the Kronecker product of 2×2 kernel matrices. Therefore, an encoder is always produced in the form of 2 to the power of n.

In FIG. 4B, it is assumed that input u7 goes through a better channel than input u0. That is, a larger index is generally assumed to indicate a better channel.

A polar code refers to a method of mapping data to a good channel and mapping a frozen bit (i.e., already known bit information, such as 0) to a poor channel using the polarization effect.

Here, a code rate is determined by (number of data bits)/(number of data bits+number of frozen bits).

Disclosure of the Specification

The disclosure proposes a method in which a system using a polar code performs channel coding on one or more pieces of downlink control information (DCI) as a channel coding scheme. According to the method described in the disclosure, different terminals may share DCI common thereto, thereby reducing complexity in blind decoding.

The disclosure proposes the configuration of a generator matrix for performing channel coding on one or more pieces of DCI using the characteristics of polar codes and an encoding and decoding method using a generator matrix.

For convenience, a polar code is illustrated in the disclosure, but the disclosure is not limited thereto. That is, the disclosure may also be applied to other coding schemes that can be expressed in a linear block code, such as a polar code.

Further, DCI is illustrated in the disclosure for convenience, but the disclosure may also be applied to uplink control information (UCI) and may also be used to design one or more transmission blocks in a general data transmission process.

In addition, encoding is illustrated in the disclosure, but the disclosure may also be applied to a decoding method by performing an encoding method in reverse.

Common DCIS Structure

Figure 5:
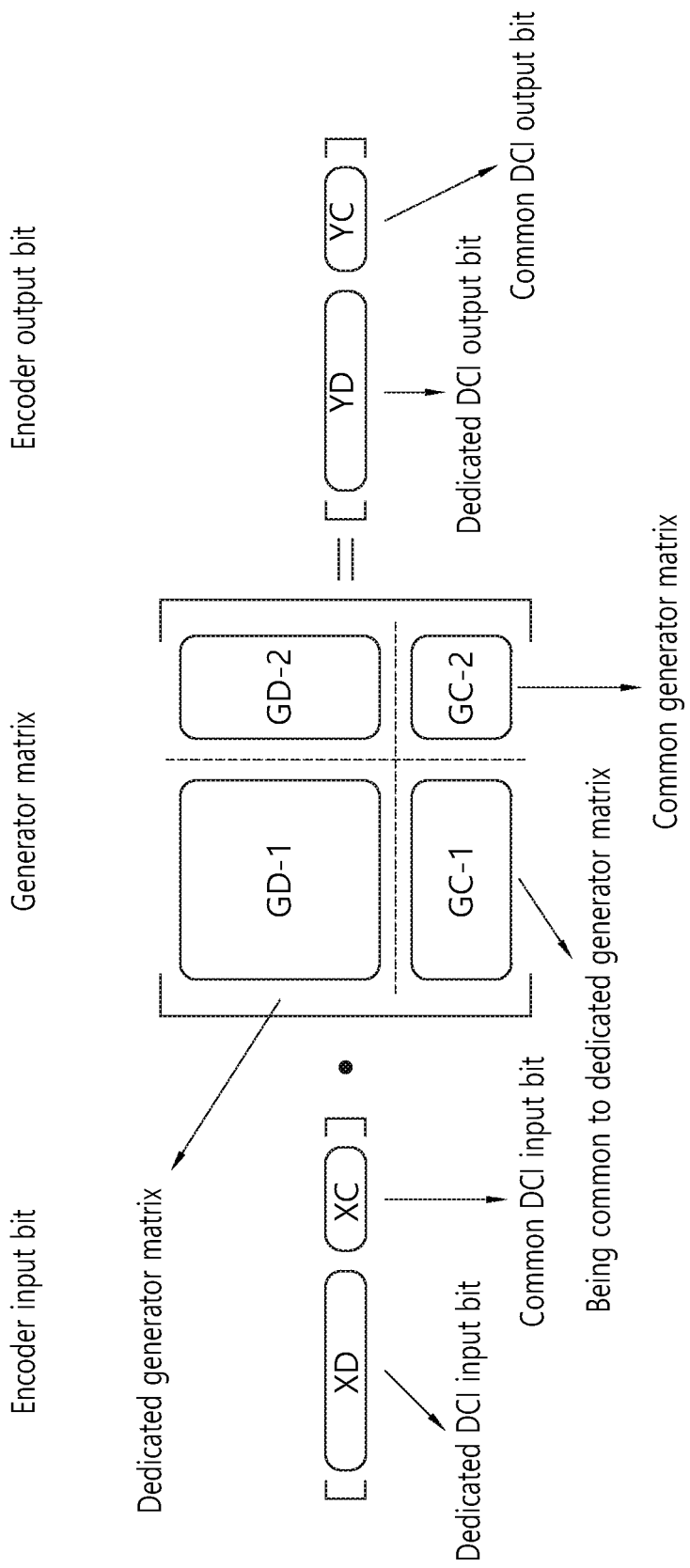
FIG. 5 illustrates the configuration of a generator matrix based on common DCI and an encoding process using the same.

FIG. 5 illustrates the configuration of a generator matrix based on common DCI and an encoding process using the same.

Referring to FIG. 5, DCI including scheduling information of a terminal may include common DCI, which is common to a plurality of terminals (or terminal groups), and dedicated DCI, which is dedicated to each terminal (or terminal group). Here, a generator matrix may be needed to encode (or decode) the common DCI and the dedicated DCI. The generator matrix may include at least one common information encoder for encoding the common DCI and at least one dedicated information encoder for encoding the dedicated DCI.

The plurality of terminals (or terminal groups) may share an encoder structure for generating a transmission block of the common DCI. That is, the terminals (or terminal groups) may use the same encoder input bit and the same generator matrix in terms of a polar code encoder.

On the contrary, for the dedicated DCI dedicated to each terminal (or terminal group), each terminal may use an independent encoder structure. That is, each terminal (or terminal group) may use different encoder input bits and the same generator matrix or different generator matrices in terms of a polar code. When the same generator matrix is used, each terminal (or terminal group) may use the same size of encoder input bits. When different generator matrices are used, each terminal (or terminal group) may use different sizes of encoder input bits.

According to an embodiment, DCI for some terminals (or terminal groups) may not include dedicated DCI. In this case, the terminals (or terminal groups) can obtain only common DCI. According to an embodiment, as the DCI includes no dedicated DCI, the terminals (or terminal groups) may repeatedly transmit some information bits of the common DCI in a dedicated DCI region that is not occupied, which is for increasing the reliability of the common DCI.

Referring to FIG. 5, DCI that includes common DCI having an NC size and an ith dedicated DCI having an ND(i) size may be subjected to one encoder, which may be designed to be the same as a polar code encoder using a generator matrix having an NC+ND(i) size.

The generator matrix may be designed such that common DCI output bits are affected only by common DCI input bits, not by dedicated DCI input bits, and dedicated DCI output bits are affected by both the common DCI input bits and the dedicated DCI input bits.

Referring to FIG. 5, XD may denote an encoder input bit corresponding to dedicated DCI having an ND size, and XC may denote an encoder input bit corresponding to common DCI having an NC size. YD may denote an encoder output bit corresponding to the dedicated DCI having the ND size, and YC may denote an encoder output bit corresponding to the common DCI having the NC size. As illustrated in FIG. 5, the encoder output bits may be generated in the form of [YD, YC]=[XD, XC]·[GD-1, GD-2; GC-1, GC-2]. As sub-matrices of the generator matrix, GD-1 may have a size of ND×ND, GD-2 may have a size of ND×NC, GC-1 may have a size of NC×ND, and GC-2 may have a size of NC×NC. Here, the dedicated DCI input bit XD may be set so as not to affect the common DCI output bit YC. To this end, GD-2 may be expressed, for example, in a matrix of all 0s. However, GC-1 may be expressed in a matrix of one or more 1s so that the dedicated DCI input bit XD affects the dedicated DCI output bit YD.

The terminals (or terminal groups) sharing the common DCI may share the sub-generator matrix GC-2 and the encoder input bit XC. However, since the dedicated DCI varies depending on terminals (or terminal groups), the respective terminals (or terminal groups) may have GD-1, GD-2, and GC-1 having different sizes and values.

Upon receiving a dedicated DCI output bit and a common DCI output bit, a terminal may perform a decoding process, thereby obtaining the dedicated DCI input bit and the common DCI input bit. The decoding process may be performed by reversing the encoding process illustrated in FIG. 5, in which the reverse matrix of the generator matrix may be used.

For example, the terminal may receive the dedicated DCI output bit and the common DCI output bit, which are channel-coded, using the generator matrix. The terminal may decode the dedicated DCI output bit and the common DCI output bit using the reverse matrix. The terminal may obtain the dedicated DCI input bit and the common DCI input bit via decoding.

For example, the terminal may obtain the dedicated DCI input bit by decoding the dedicated DCI output bit and the common DCI output bit and may obtain the common DCI input bit by decoding the common DCI output bit.

Figure 6:
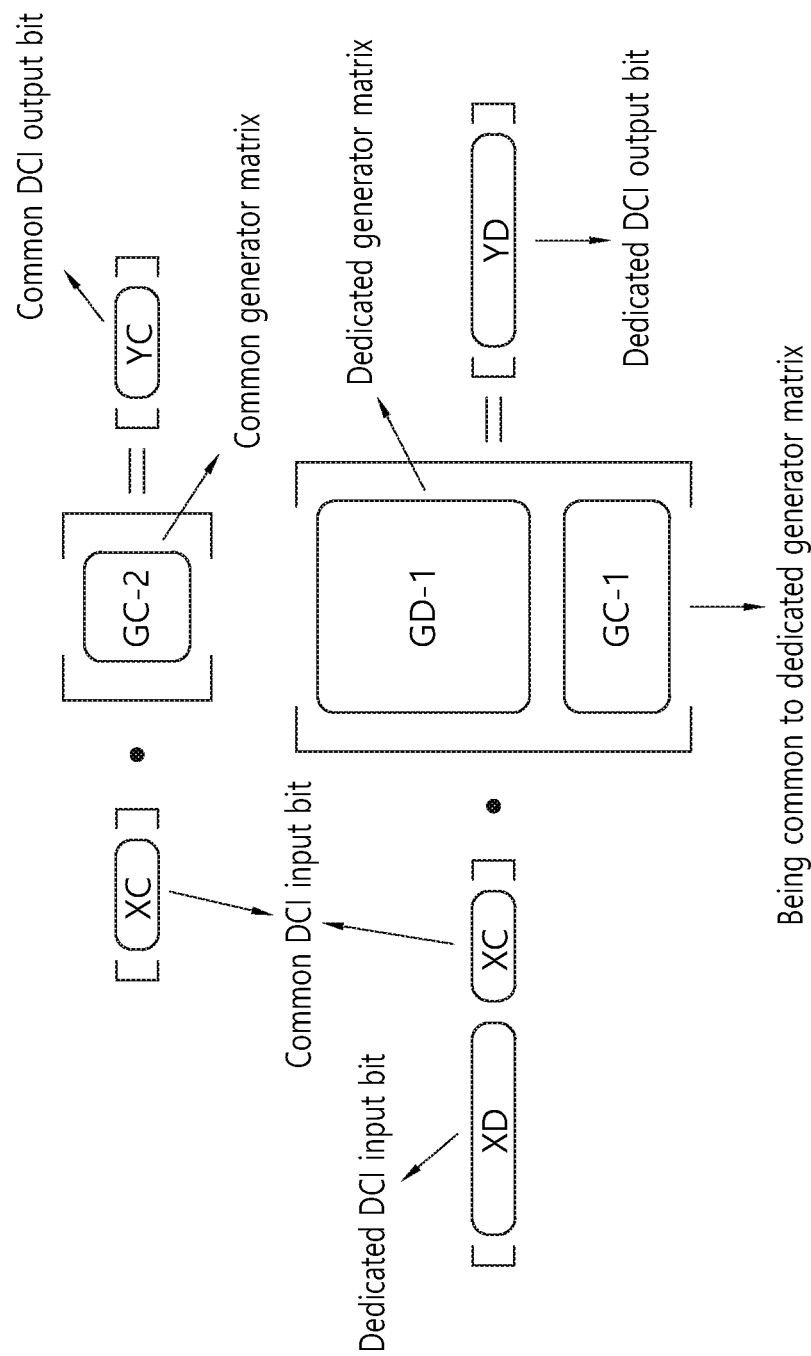
FIG. 6 separately illustrates encoding of common DCI and encoding of dedicated DCI in order to describe the generator matrix illustrated in FIG. 5.

FIG. 6 separately illustrates encoding of common DCI and encoding of dedicated DCI in order to describe the generator matrix illustrated in FIG. 5.

Referring to FIG. 6, information of dedicated DCI may not be reflected in encoding a common DCI output bit, while both information of common DCI and the information of the dedicated DCI may be reflected in encoding a dedicated DCI output bit.

For example, the common DCI output bit YC may be generated in the form of YC=XC·GC-2, and the dedicated DCI output bit YD may be generated in the form of YD=[XD, XC]·[GD-1; GD-2].

Figure 7:
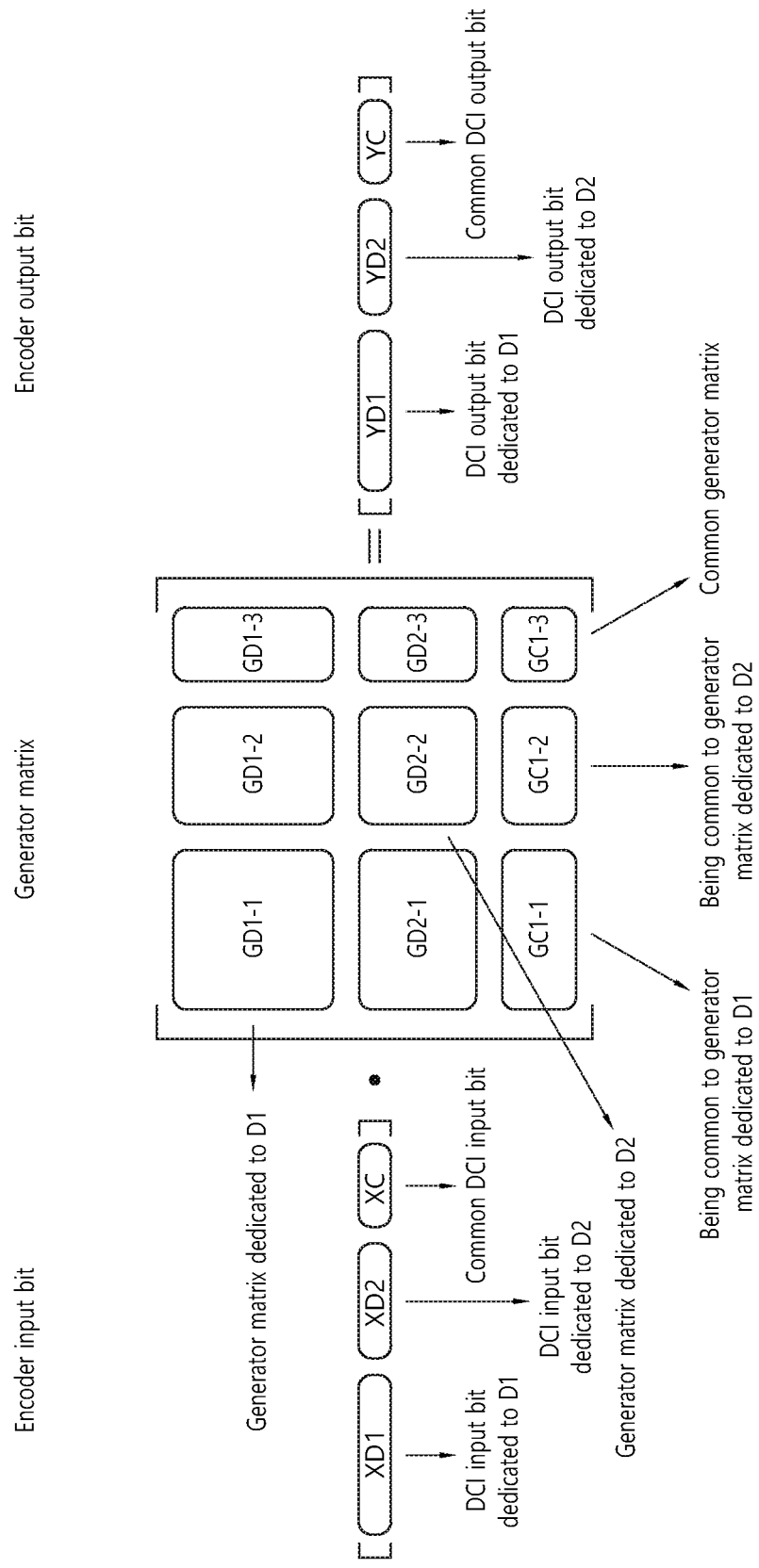
FIG. 7 illustrates a method of configuring a generator matrix for performing channel coding on DCI corresponding to a plurality of terminals.

FIG. 7 illustrates a method of configuring a generator matrix for performing channel coding on DCI corresponding to a plurality of terminals.

FIG. 7 shows a method of configuring a generator matrix in the presence of a first terminal D1 and a second terminal D2. The generator matrix may be a matrix in which encodings for a plurality of terminals (or terminal groups) are integrated.

A common DCI output bit is affected only by a common DCI input bit but may not be affected by a dedicated DCI input bit. Each dedicated DCI output bits is affected by the common DCI input bit and a dedicated DCI input bit thereof but may not be affected by a dedicated DCI input bit of a different terminal.

For example, an encoder output bit may be generated in the form of [YD1, YD2, YC]=[XD1, XD1, XC]·[GD1-1, GD1-2, GD1-3; GD2-1, GD2-2, GD2-3; GC-1, GC-2, GC-3]. As submatrices of the generator matrix, GD1-1, GD1-2, GD1-3, GD2-3, GD2-3, GD2-3, GC-1, GC-2, and GC-3 are ND1×NC, ND2×ND1, ND2×ND2, ND2×NC, NC×ND1, NC×ND2, and NC×NC in size, respectively.

As submatrices of the generator matrix, GD1-1 may have a size of ND1×ND1, GD1-2 may have a size of ND1×ND2, GD1-3 may have a size of ND1×NC, GD2-1 may have a size of ND2×ND1, GD2-2 may have a size of ND2×ND2, GD2-3 may have a size of ND2×NC, GC-1 may have a size of NC×ND1, GC-2 may have a size of NC×ND2, and GC-3 may have a size of NC×ND3.

Here, GD1-3 and GD2-3 may be expressed in a matrix of all 0s so that a first dedicated DCI input bit XD1 and a second dedicated DCI input bit XD2 do not affect a common DCI output bit YC. Also, GD1-3 and GD2-3 may be expressed in a matrix of all 0s so that a first dedicated DCI output bit YD1 is not affected by the second dedicated DCI input bit XD2 and a second dedicated DCI output bit YD2 is affected by the first dedicated DCI input bit XD1. When the first dedicated DCI output bit YD1 and the second dedicated DCI output bit YD2 are designed to be affected by the common DCI input bit XC, GC-1 and GC-2 may have at least one or more 1s.

FIG. 7 illustrates two terminals (or terminal groups) for convenience, but the disclosure is not limited thereto. That is, the description of FIG. 7 may be extended to three or more terminals (or terminal groups).

Figure 8:
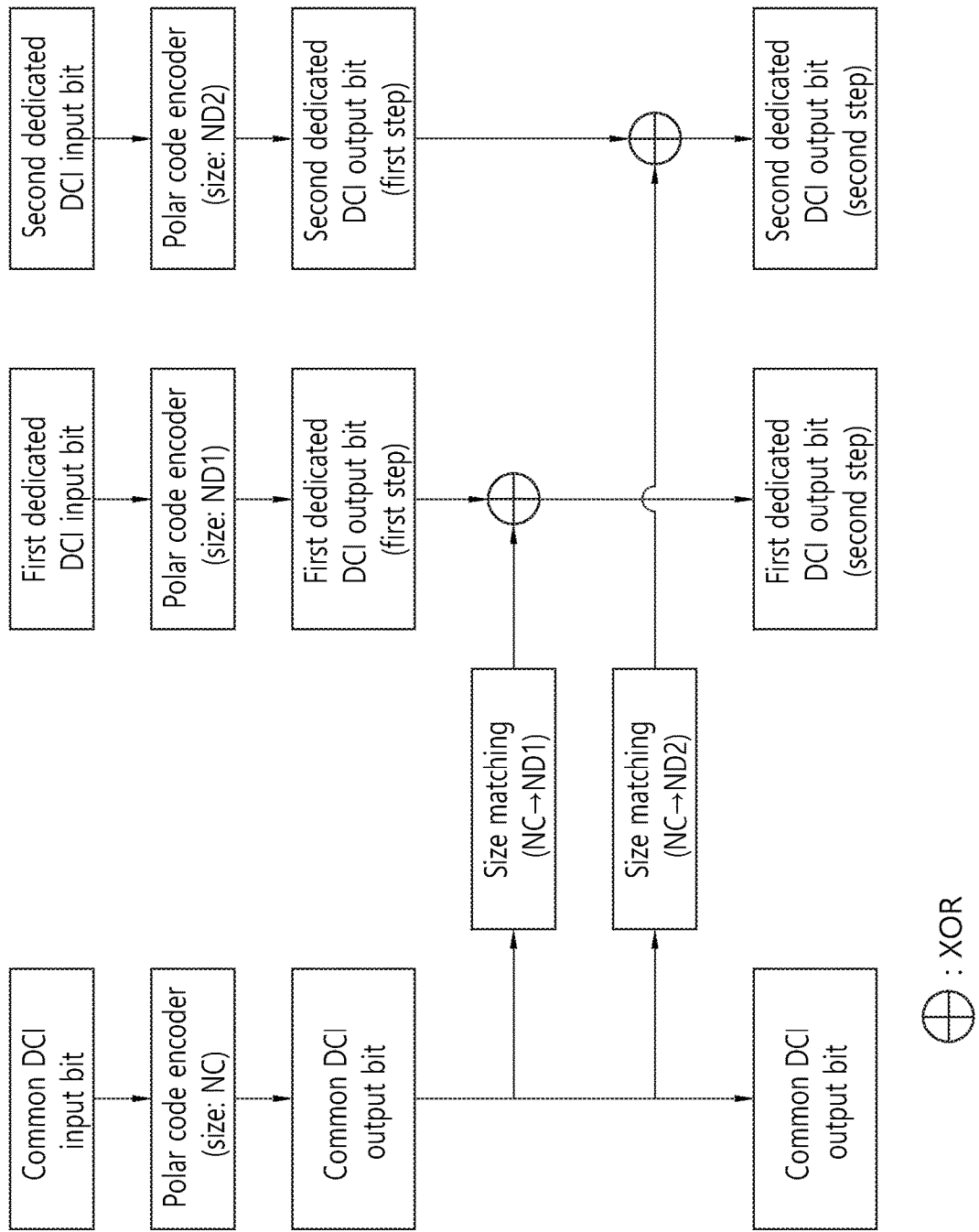
FIG. 8 is a block diagram illustrating a method of generating an encoder output bit according to an embodiment based on a common DCI structure.

FIG. 8 is a block diagram illustrating a method of generating an encoder output bit according to an embodiment based on a common DCI structure.

Referring to FIG. 8, a polar code encoder included in each terminal (or terminal group) may independently perform encoding of a dedicated DCI input bit and encoding of a common DCI input bit and may combine the results of each encoding to output a final encoder output bit.

For example, there are pieces of dedicated DCI respectively for a first terminal D1 and a second terminal D2 and one piece of common DCI, a first dedicated DCI input bit XD1 for the first terminal D1 may have a size of ND1, a second dedicated DCI input bit XD2 for the second terminal D2 may have a size of ND2, and a common DCI input bit may have a size of NC.

Each of the input bits XD1, XD2, and XC may generate an output bit (first-stage output bit) via an independent generator matrix corresponding to the size. That is, the common DCI may generate a common DCI output bit using a polar code encoder having an NC size, the first dedicated DCI input bit for the first terminal D1 may generate a first-stage first dedicated DCI output bit using a polar code encoder having an ND1 size, and the second dedicated DCI input bit for the second terminal D2 may generate a first-stage second dedicated DCI output bit using a polar code encoder having an ND2 size.

Among second-stage output bits as final encoder output, a common DCI output bit may have the same value as the first-stage output bit. A second-stage first dedicated DCI output bit may be generated by performing an operation (e.g., XOR operation) using the common DCI output bit and the first-stage first dedicated DCI output bit. A second-stage second dedicated DCI output bit may be generated by performing an operation (e.g., XOR operation) using the common DCI output bit and the first-stage second dedicated DCI output bit.

Here, when the size NC of the common output bit is different from the size ND1 (or ND2) of the dedicated output bit, size matching may be performed to match up the size of the common output bit with the size of the dedicated output bit.

The size matching may be performed by a combination of repetition, puncturing, and zero padding.

Figure 9:
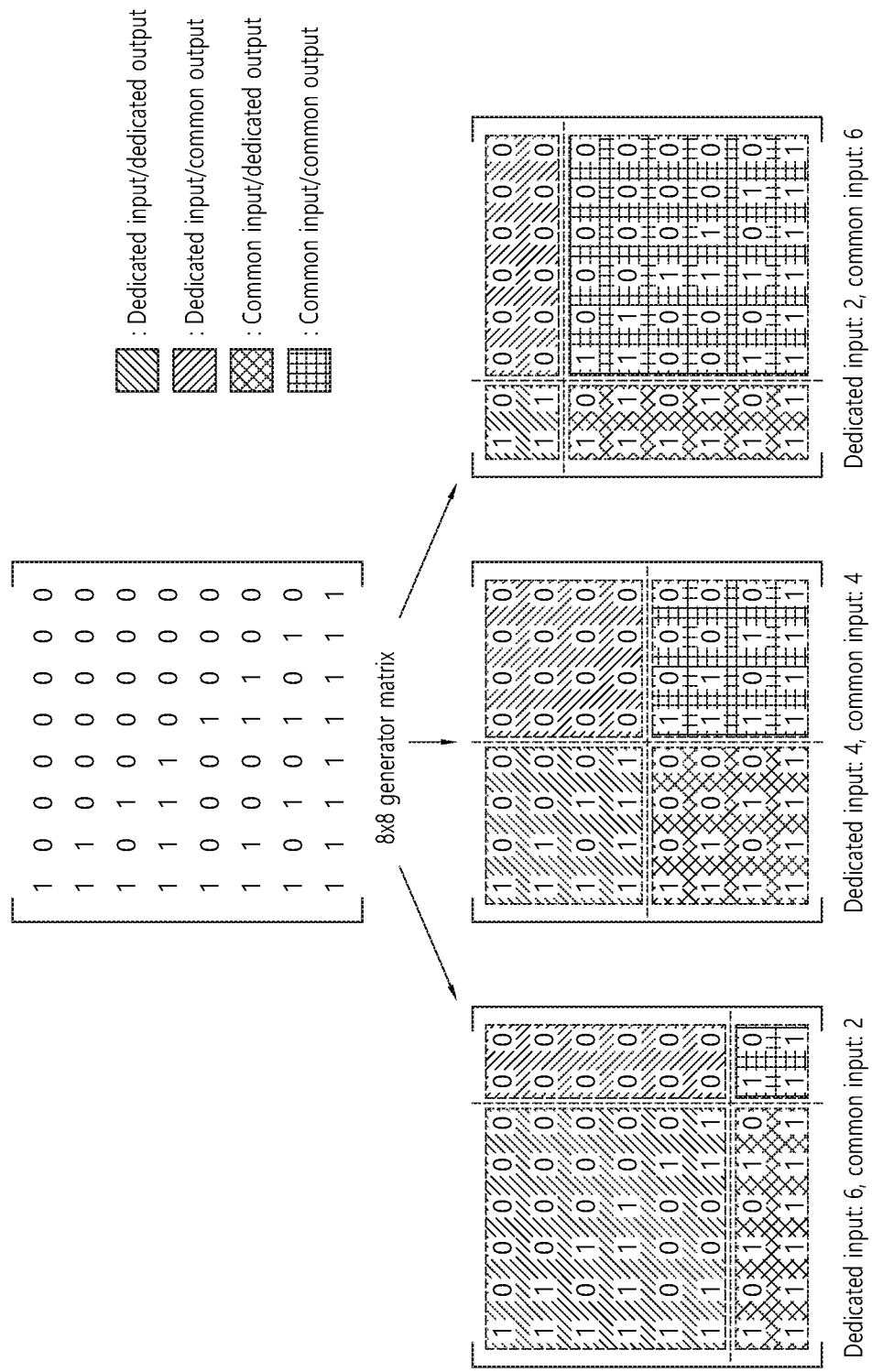
FIG. 9 illustrates a method of generating a generator matrix according to an embodiment of the disclosure.

FIG. 9 illustrates a method of generating a generator matrix according to an embodiment of the disclosure.

Referring to FIG. 9, the generator matrix illustrated in FIG. 5 may be generated by the Kronecker product of kernel matrices having an arbitrary size. The generated generator matrix may be expressed in a low triangular form.

When ND dedicated input bits and NC common input bits are needed, a first index column to an NDth index column of the matrix may be used for dedicated output bits and an ND+1th index column to an ND+NCth index column of the matrix may be used for common output bits.

Further, a first index row to an NDth index row of the matrix may be used for dedicated input bits and an ND+1th index row to an ND+NCth index column of the row may be used for common output bits.

Referring to FIG. 9, FIG. 9 illustrates a method of generating an 8×8 generator matrix using the Kronecker product of 2×2 kernel matrices and a method of utilizing the same. Although FIG. 9 shows an example of generating a generator matrix using a 2×2 kernel matrix, the disclosure is not limited thereto. That is, the method of FIG. 9 may be applied to a kernel matrix having any size and may also be applied to a combination of two or more kernel matrices having different sizes.

Method of Determining Position of Frozen/Unfrozen Bit of Encoder Input Bits

Hereinafter, a method of determining the position of a frozen bit/unfrozen bit applied to DCI according to the common DCI structure will be described. A method of determining the position of a frozen bit/unfrozen bit of encoder input bits of common DCI may be one of the following. According to an embodiment, a frozen bit may be understood as a known bit, and an unfrozen bit may be understood as an information bit.

1. Method 1: The position of a frozen bit/unfrozen bit may be determined in consideration of the size (NC) of common DCI encoder input bits (XC in FIG. 5) and the size (KC) of information bits included in the common DCI encoder input bits. The position of frozen/unfrozen bits of common DCI may be determined by selecting KC optimized unfrozen bit positions in consideration of a polar code having an NC size, which may be for supporting a terminal (or a terminal group) to obtain only the common DCI or may be for enabling a UE to obtain information about the common DCI even though failing to decode dedicated DCI fails.

2. Method 2: The position of a frozen bit/unfrozen bit may be determined in consideration of the total size (NT(i)=NC+ND(i)) of encoder input bits for a particular terminal (or terminal group) and the size (KC) of information bits included in common DCI encoder input bits. Here, i denotes the index of a terminal (or terminal group), and the particular terminal (or terminal group) among a plurality of terminals (or terminal groups) may be determined as a criterion for selecting the position of the frozen/unfrozen bit of common DCI. A criterion for selecting the particular terminal (or terminal group) may be the size of information bits of dedicated DCI, the size of encoder input bits of the dedicated DCI, or the coverage level of a terminal (or terminal group).

Alternatively, the position may be determined on the basis of the service type of the particular terminal (or terminal group), the category of the terminal (or terminal group), or priority relating to a scheduling delay.

Here, an optimized frozen/unfrozen bit position may be calculated on the basis of NT(i), and KC unfrozen bit positions may be selected from among NC indices of a generator matrix for the common DCI.

Method 2 may be employed to satisfy the target performance of a particular terminal (or terminal group) or to meet minimum requirements in view of overall system.

Method 3: The position of a frozen bit/unfrozen bit may be determined in consideration of the total sizes ({NT(i) |i∈S}) of encoder input bits for a plurality of terminals (or terminal groups) and the size (KC) of common DCI encoder input bits. Here, i denotes the index of a terminal (or terminal group), and S denotes a set of indices of terminals (or terminal groups) considered in determining the position of the frozen/unfrozen bit of common DCI.

When the total size NT(i) of encoder input bits varies, KC optimized frozen/unfrozen bit positions may vary. Accordingly, the position of the frozen/unfrozen bit of the common DCI may be determined by selecting the position of an unfrozen bit that can be shared by all terminals (or terminal groups) belonging to S.

For example, the position of the frozen/unfrozen bit may be determined by a sequential method. In this case, candidates for KC unfrozen bit positions may be first determined on the basis of NT(i) of a terminal (or terminal group) belonging to S, and an index commonly occurring in all terminals (or terminal groups) among the candidates may be determined as the position of the unfrozen bit for the common DCI.

When the number of selected bit positions is less than KC, KC+1 unfrozen bit positions may be set as candidates on the basis of NT(i) of the terminal (or terminal group) belonging to S, and an index commonly occurring in all terminals (or terminal groups) among the candidates may be determined as the position of the unfrozen bit for the common DCI. This determination method is repeated until the number of unfrozen bit positions for the common DCI selected as the result of calculation is KC, and the size of a candidate determined for each terminal (or terminal group) may be increased whenever the method is repeated. For example, the size of the candidate may be increased by one, which may be for improving the decoding reliability of a terminal (or terminal group) in S in general terms.

When the methods described above are applied, the position of a frozen bit/unfrozen bit may be determined to be an optimized position according to a certain criterion. For example, the optimized position of a frozen bit/unfrozen bit may be determined by a method of selecting a bit position with the highest reliability in terms of channel reliability of each encoder input bit, which may be, for example, a density evaluation method.

Alternatively, each index of an encoder input bit may be expressed in bits, and the weighted sum of generated bits may be obtained, thereby determining the position of a frozen bit/unfrozen bit in the order of weighted sum.

A method of determining the position of a frozen bit/unfrozen bit of encoder input bits for dedicated DCI may select KD(i) optimized unfrozen bit positions in consideration of the total size NT(i)=NC+ND(i) of encoder input bits for a terminal (or terminal group) and the size KD(i) of information. Here, an optimized frozen/unfrozen bit position may be calculated on the basis of NT(i), and KD(i) unfrozen bit positions may be selected from among ND(i) indices of a generator matrix for the dedicated DCI.

Method of Determining Aggregation Level (AL)

When DCI conforms to a common DCI structure and includes common DCI and dedicated DCI, encoder output bits of each encoded DCI may form a separate transmission block to be transmitted via a separate PDCCH. Here, each transmission block may have a different aggregation level. The aggregation level of each transmission block may be selected in consideration of one or more of the following.

1. Criterion 1: To achieve target performance of terminal (or terminal group)

Considering criterion 1, the aggregation level of a transmission block corresponding to dedicated DCI may be determined in view of the channel condition of each terminal (or terminal group). The aggregation level of a transmission block corresponding to common DCI may be selected on the basis of a terminal (or terminal group) having a relatively poor channel in order to support all terminals (or terminal groups).

2. Criterion 2: To reduce overhead of transmission block

Considering criterion 2, the aggregation level of a transmission block corresponding to common DCI is limited to a size satisfying the minimum requirement in order to reduce the overhead of an entire system, while the aggregation level of a transmission block corresponding to DCI dedicated to a terminal (or terminal group) having a relatively poor channel may be increased to satisfy criterion 1. This is for preventing an unnecessary increase in aggregation level from the perspective of other terminals (or terminal groups) considering that information of the common DCI is reflected in dedicated output bits.

Position information in the time/frequency domain of the generated PDCCH may be differently designated for each terminal (or terminal group) through higher-layer signaling. When the position of a PDCCH for the common DCI collides with the position of a PDCCH for the dedicated DCI, the PDCCH for the common DCI may be preferentially selected.

Method of Performing Rate Matching

Hereinafter, a method of performing rate matching when DCI conforms to a common DCI structure and encoder output bits of encoded DCI form different transmission blocks will be described. The method of performing rate matching may be any one of the following.

1. Method 1: Method of performing rate matching independently on each transmission block According to method 1, each transmission block may individually be subjected to rate matching according to available radio resources thereof and the size of encoder output bits. That is, dedicated DCI output bits and common DCI output bits may independently be subjected to rate matching. Referring to FIG. 8, the first dedicated DCI output bit, the second dedicated DCI output bit, and the common DCI output bit may independently be subjected to rate matching.

2. Method 2: Method of adding some output bits of common DCI to transmission block for dedicated DCI According to method 2, a region punctured in rate matching of a transmission block for common DCI may be added to a transmission block for dedicated DCI. Alternatively, a repeated region required in rate matching of a transmission block for common DCI may be added to dedicated DCI.

Here, a transmission block to which some output bits of common DCI are added may be limited to a dedicated DCI transmission block for a particular terminal (or terminal group). This method may be for satisfying the target performance of a terminal (or terminal group) having a relatively poor channel in a situation where the size of the transmission block for the common DCI is limited. Alternatively, this method may be for utilizing spare resources to increase the reliability of the common DCI when the size of encoder output bits of the common DCI is relatively larger than the size of encoder output bits of particular dedicated DCI.

Method 2 may be used to puncture only output bits of the dedicated DCI without puncturing the output bits of the common DCI. In this case, some output bits of the common DCI may be included in the transmission block configuration of the dedicated DCI. This may be for optimizing a puncturing pattern in terms of the total coded bits of the common DCI and the dedicated DCI. For example, when a method of sequentially implementing puncturing patterns in the order of encoder output bit index in a particular encoder structure guarantees optimal performance, a method of puncturing the output bits of the dedicated DCI without puncturing the output bits of the common DCI may be applied.

3. Method 3: Method of adding some output bits of dedicated DCI to transmission block for common DCI According to method 3, a region punctured in rate matching of a transmission block for dedicated DCI may be added to a transmission block for common DCI. Alternatively, a repeated region required in rate matching of a transmission block for dedicated DCI may be added to common DCI.

This method may be for satisfying the target performance of a terminal (or terminal group) having a relatively poor channel in a situation where the size of a transmission block for the dedicated DCI is limited. Alternatively, this method may be for utilizing spare resources to increase the reliability of the dedicated DCI when the size of encoder output bits of the dedicated DCI is relatively larger than the size of encoder output bits of the common DCI or the size of encoder output bits of different dedicated DCI.

As described above, information included in common DCI is included in a transmission block for the dedicated DCI, which may be for decoding the common DCI in the transmission block for the dedicated DCI when decoding of the common DCI fails. For example, a transmission block for common DCI may be encoded to include only information corresponding to the common DCI, and a transmission block for dedicated DCI may be encoded to include both information corresponding to common DCI and information corresponding to the dedicated DCI. Here, in the process of encoding the transmission block for the dedicated DCI, it is possible to determine the information corresponding to the dedicated DCI to have an unfrozen bit position with higher reliability than that of the information corresponding to the common DCI. Accordingly, when the transmission block for the common DCI is successfully decoded, the information corresponding to the common DCI is processed as a frozen bit (or a known bit) in the process of decoding the transmission block for the dedicated DCI, thereby improving the decoding performance of the dedicated DCI. When decoding of the transmission block for the common DCI fails, it is possible to decode both the information corresponding to the common DCI and the information for the dedicated DCI in the process of decoding the transmission block for the dedicated DCI.

Sequential DCI Structure

Hereinafter, proposed is a method for configuring a generator matrix using the characteristics of a polar code when DCI is divided into first-stage DCI and second-stage DCI and a transmission block is also divided into a first-stage transmission block and a second-stage transmission block.

The following method includes a method of designing a polar code to decode the second-stage DCI by decoding the first-stage DCI. For example, when the first-stage DCI is successfully decoded, a terminal may reflect the result of decoding the first-stage transmission block in decoding the second-stage DCI, thereby increasing reliability. To this end, the first-stage transmission block may include the first-stage DCI, and the second-stage transmission block may include the second-stage DCI. However, the second-stage transmission block may include only the second-stage DCI (i.e., only the second-stage DCI may be transmitted via the second-stage transmission block). This method may be for determining whether to receive or decode the second-stage transmission block on the basis of decoding of the first-stage DCI. For example, the first-stage DCI may include information for identifying a terminal, such as an RNTI. When the terminal identifies that the RNTI corresponds thereto, the terminal may receive or decode the second-stage transmission block.

Also, this method may be for increasing the reliability of decoding the second-stage DCI. For example, when the first-stage DCI is successfully decoded, if the second-stage transmission block is decoded using the second-stage DCI included in the first-stage transmission block, it is possible to increase effective code rate in terms of the second-stage DCI.

In the following method, the first-stage DCI having an N1 size and the second-stage DCI having an N2 size may be expressed in the form of one encoder. The one encoder may be a polar code encoder using a generator matrix having an N1+N2 size. Here, an encoder output bit used to configure the first-stage transmission block needs to be affected by both an encoder input bit corresponding to the first-stage DCI and an encoder input bit corresponding to the second-stage DCI. However, an encoder output bit corresponding to the second-stage DCI needs to be affected only by the encoder input bit corresponding to the second-stage DCI.

Figure 10:
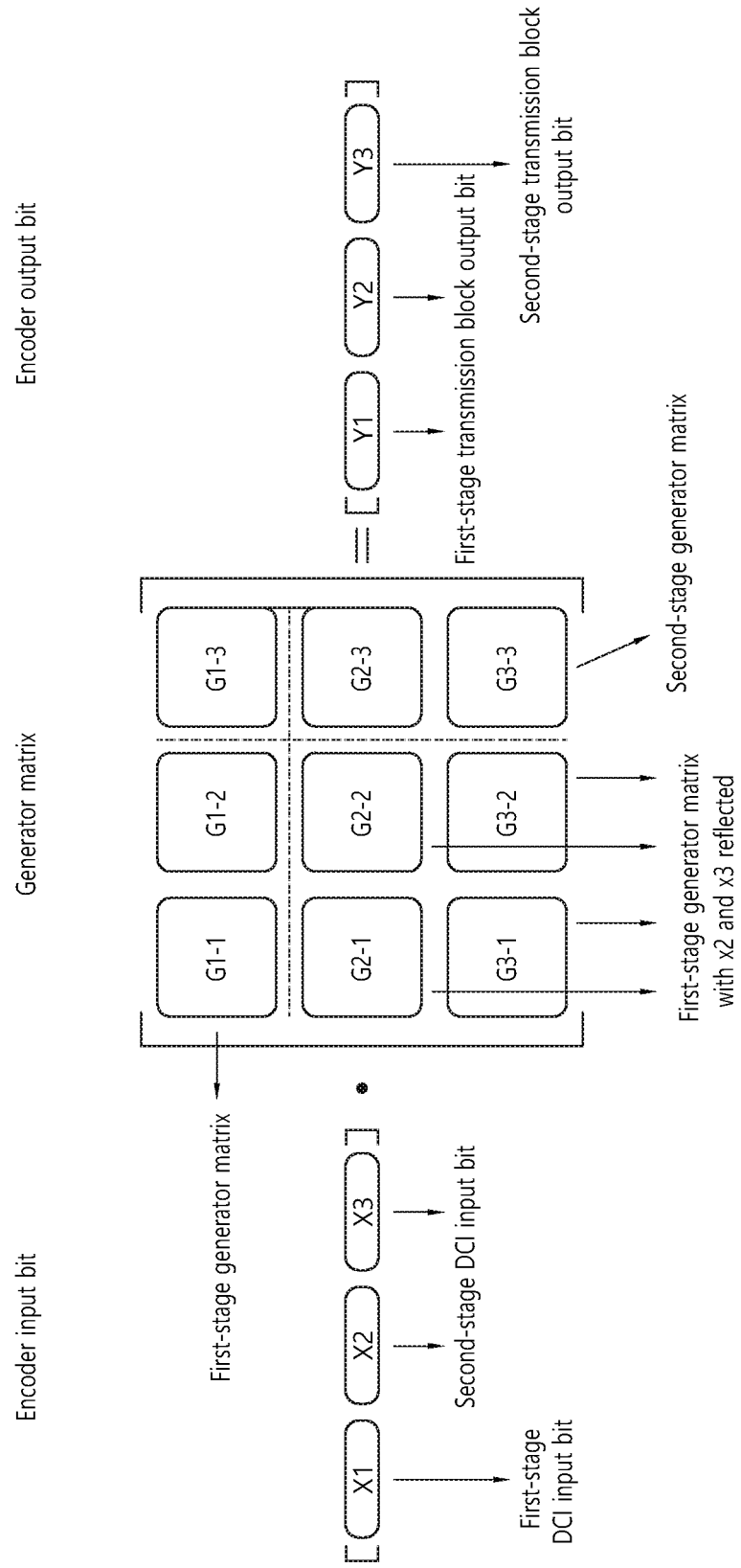
FIG. 10 illustrates the configuration of a generator matrix based on a sequential DCI structure and an encoding process using the same.

FIG. 10 illustrates the configuration of a generator matrix based on a sequential DCI structure and an encoding process using the same.

Referring to FIG. 10, X1 may denote an encoder input bit corresponding to first-stage DCI and having an N1 size, X2 may denote an encoder input bit corresponding to second-stage DCI and having an N2 size, and X3 may denote an encoder input bit corresponding to third-stage DCI and having an N3 size. Further, Y1 may denote an encoder output bit having an N1 size and may be transmitted via a first-stage transmission block, Y2 may denote an encoder output bit having an N2 size and may be transmitted via the first-stage transmission block, and Y3 may denote an encoder output bit having an N3 size and may be transmitted via a second-stage transmission block.

As illustrated in FIG. 10, the encoder output bits may be in the form of [y1, y2, y3]=[x1, x2, x3]·[G1-1, G1-2, G1-3; G2-1, G2-2, G2-3; G3-1, G3-2, G3-3]. As submatrices of the generator matrix, G1-1 may have a size of N1×N1, G1-2 may have a size of N2×N1, G1-3 may have a size of N3×N1, G2-1 may have a size of N1×N2, G2-2 may have a size of N2×N2, G2-3 may have a size of N3×N2, G3-1 may have a size of N1×N3, G3-2 may have a size of N2×N3, and G3-3 may have a size of N3×N3.

Here, G1-2 and G1-3 may be matrices of all 0s so that X1 does not affect Y2 and Y3. G2-3 may be a matrix of all 0s so that X1 and X2 do not affect Y3. However, G2-1, G2-2, G3-1, and G3-2 may have one or more is so that X1 and X2 can affect the first-stage transmission block corresponding to G2-1, G2-2, G3-1 and G3-2.

Figure 11:
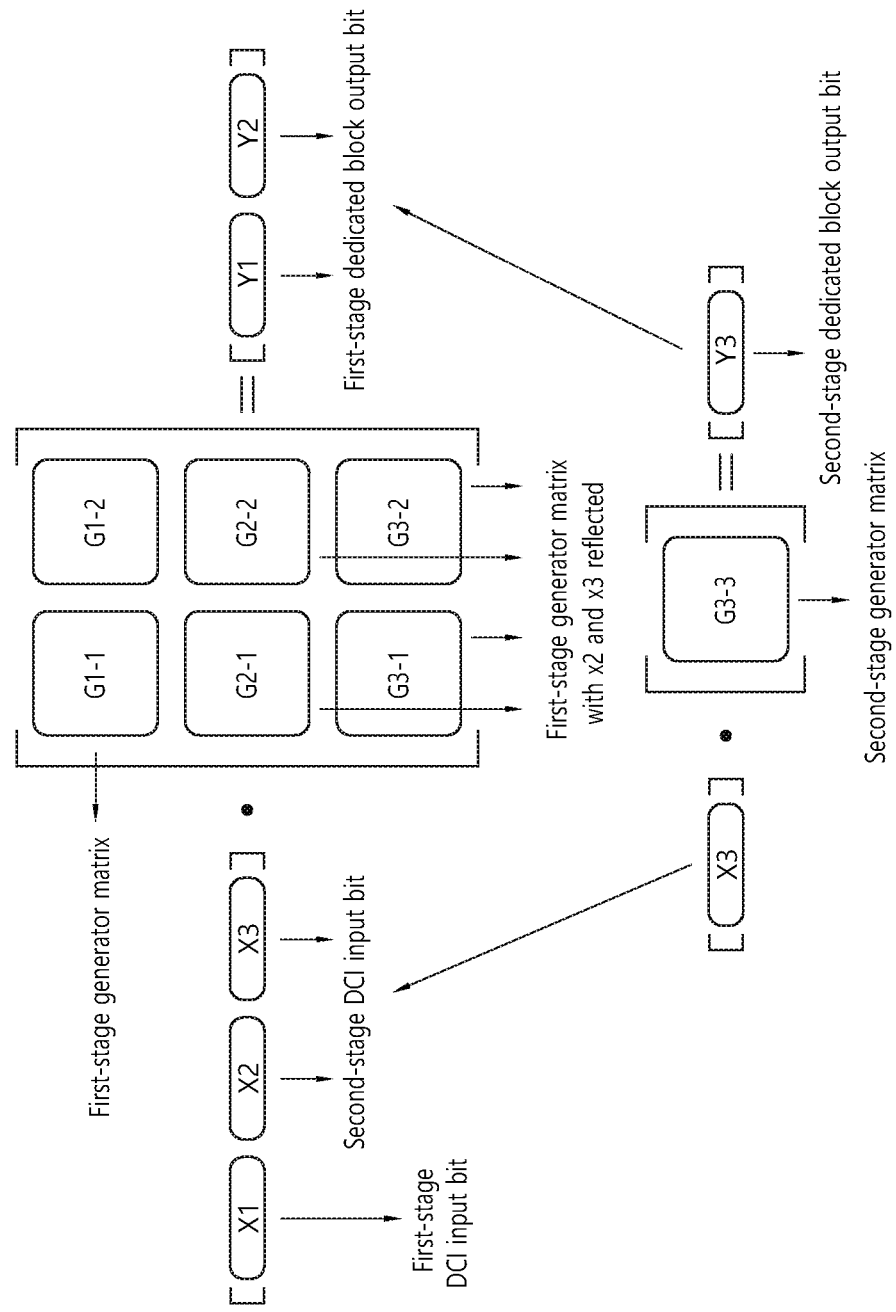
FIG. 11 separately illustrates encoding of first-stage transmission block and encoding of second-stage transmission block illustrated in FIG. 10.

FIG. 11 separately illustrates encoding of the first-stage transmission block and encoding of the second-stage transmission block illustrated in FIG. 10.

Referring to FIG. 11, the first-stage DCI may not be reflected in encoding an output bit corresponding to the second-stage transmission block. However, both the first-stage DCI and the second-stage DCI may be reflected in encoding an output bit corresponding to the first-stage transmission block.

As illustrated in FIG. 11, the output bit corresponding to the first-stage transmission block may be [Y1, Y2]=[X1, X2, X3]·[G1-1, G1-2; G2-1, G2-2; G3-1, G3-2], and the output bit corresponding to the second-stage transmission block may be Y3=X3·G3-3.

Figure 12:
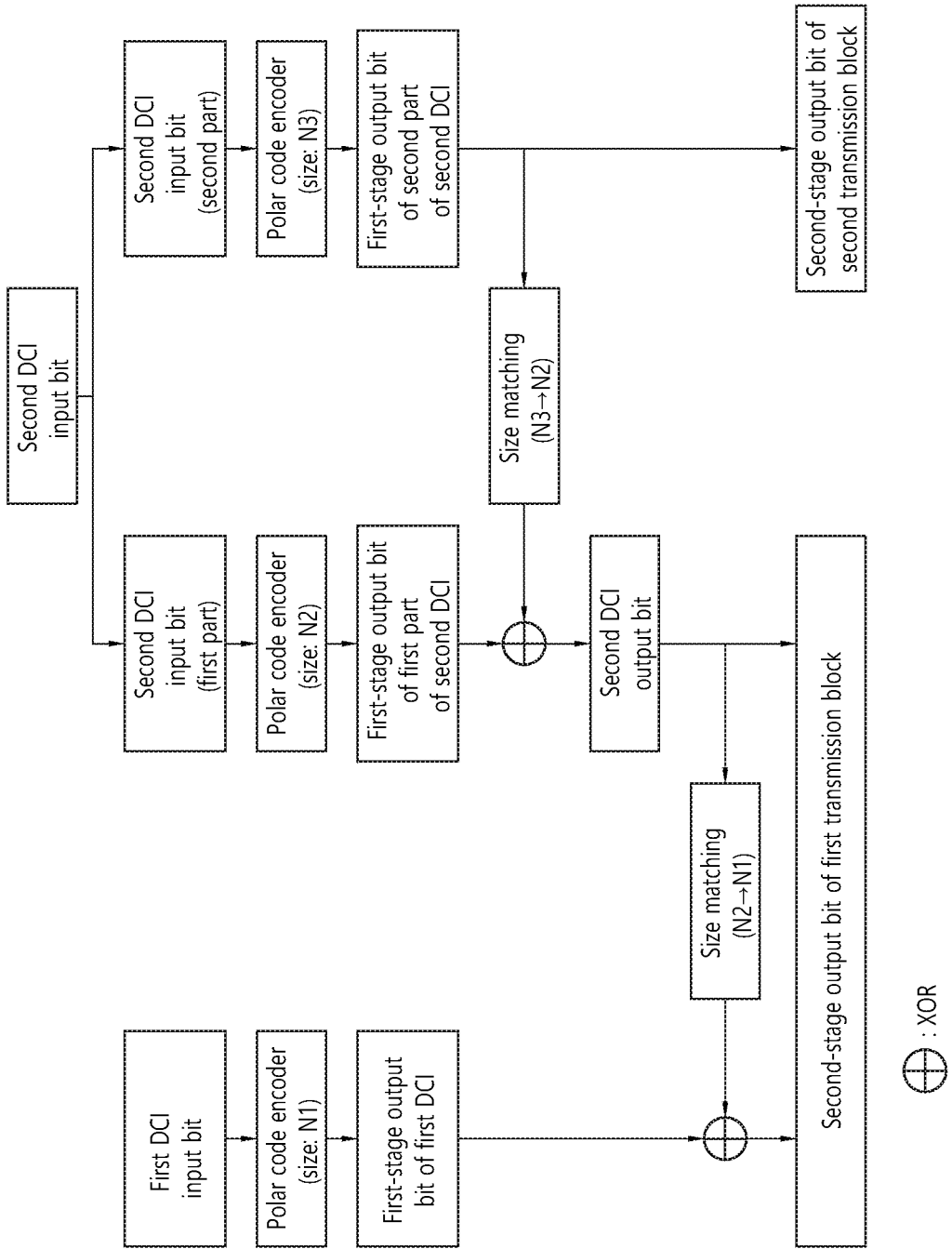
FIG. 12 is a block diagram illustrating a method of generating a encoder output bit according to an embodiment based on a sequential DCI structure.

FIG. 12 is a block diagram illustrating a method of generating an encoder output bit according to an embodiment based on a sequential DCI structure.

Referring to FIG. 12, according to a sequential DCI structure proposed in the disclosure, DCI input bits may be independently encoded, and the encoding results may be combined, thereby generating final encoder output bits. Here, a second DCI input bit may be divided into a first part and a second part, each of which may be independently encoded. For example, when an encoder input bit for first DCI has an N1 size and two encoder input bits for second DCI have an N2 size and an N3 size, respectively, the respective input bits may generate first-stage output bits using independent generator matrices corresponding to the size thereof.

A second DCI output bit may be generated by performing an XOR operation on a first part of second DCI and a second part of the second DCI, which are generated using a polar code encoder. Here, when the first part and the second part of the second DCI have different sizes, size matching may be performed on the basis of one part. The size matching may be performed by a combination of repetition, puncturing, and zero padding. A part corresponding to a first transmission block among second-stage output bits as a final encoder output result may include a part obtained by performing an XOR operation on output bits corresponding to the first DCI among first-stage output bits and the second DCI output bit and the second DCI output bit. When the output bits corresponding to the first DCI and the second DCI output bit have different sizes, size matching may be performed on the basis of the output bits corresponding to the first DCI.

A part corresponding to a second transmission block among the second-stage output bits as the final encoder output result may include an output bit corresponding to the second DCI among the first-stage output bits. When size matching is performed on the basis of the first part (or the second part) in the process of generating the second DCI output bit, the output bit for the second transmission block may be a first-stage output bit corresponding to the second part (or the first part).

Method of Determining Position of Frozen/Unfrozen Bit of Encoder Input Bits

Hereinafter, a method of determining the position of a frozen bit/unfrozen bit applied to DCI according to the sequential DCI structure will be described. A method of determining the position of a frozen/unfrozen bit of encoder output bits of first DCI may be one of the following.

1. Method 1: The position of a frozen/unfrozen bit may be determined in consideration of the size (N1) of first DCI encoder input bits and the size (K1) of information of the first DCI encoder input bits. According to method 1, for the position of frozen/unfrozen bits of first DCI, K1 optimized unfrozen bit positions may be selected in consideration of a polar code having an N1 size, which may be for performing decoding regarding the impact of remaining bits as interference on the basis of decoding of the first DCI.

2. Method 2: The position of a frozen/unfrozen bit may be determined in consideration of the size (N1) of first DCI encoder input bits, the size (N2) of a first part (X2 in FIG. 11 and FIG. 12) of a first part among second DCI encoder input bits, and the size (K1) of information of the first DCI encoder input bits. For the position of frozen/unfrozen bits of first DCI, K1 optimized unfrozen bit positions may be selected from a region corresponding to N1 in consideration of a polar code having an N1+N2 size, which may be for considering that the optimized unfrozen bit positions in the region corresponding to N1 can change depending on N2 on the basis of decoding of a first-stage transmission block.

When the methods described above are applied, the position of a frozen/unfrozen bit may be determined by selecting an optimized bit position. An optimized frozen/unfrozen bit position may be determined by a method of selecting a bit position with the highest reliability in terms of channel reliability of each encoder input bit, which may be, for example, a density evaluation method.

Alternatively, each index of an encoder input bit may be expressed in bits, and the weight sum of generated bits may be obtained, thereby determining the position of a frozen bit/unfrozen bit in the order of weighted sum.

Method of Determining Aggregation Level (AL)

When DCI conforms to a sequential DCI structure and includes first-stage DCI and second-stage DCI, a first-stage transmission block and a second-stage transmission block may be separately formed and may be transmitted via separate PDCCHs. Here, the respective transmission blocks may have different aggregation levels. The aggregation level of the second-stage transmission block may be dependent on the aggregation level of the first-stage transmission block, because the first-stage transmission block includes information of the second-stage DCI, and the second-stage DCI is used to decode the second-stage transmission block.

For example, when the aggregation level of the first-stage transmission block is determined to be high, the aggregation level of the second-stage transmission block may be relatively low. On the contrary, when it is determined that the aggregation level of the first-stage transmission block is not high enough to decode the second-stage DCI, the aggregation level of the second-stage transmission block may be increased.

Position information in the time/frequency domain of each generated PDCCH may be differently designated for each terminal (or terminal group) through higher-layer signaling. When the position of a PDCCH for the first-stage transmission block collides with the position of a PDCCH for the second-stage transmission block, the PDCCH for the first-stage transmission block may be preferentially selected.

Method of Performing Rate Matching

Hereinafter, according to the sequential DCI structure, a method of performing rate matching for a first-stage transmission block may be any of the following.

1. Method 1: Method of performing rate matching on encoder output bits for first-stage DCI and encoder output bits for second-stage DCI at the same ratio According to method 1, equal numbers of output bits for the first-stage DCI and output bits for the second-stage DCI may be punctured or repeated.

2. Method 2: Method of performing rate matching by assigning higher priority to encoder output bits for first-stage DCI Method 2 may be for increasing performance in decoding first-stage DCI, which may have relatively lower reliability than second-stage DCI. According to method 2, when repetition is required, encoder output bits including information of the first-stage DCI are repeated. When puncturing is required, some of encoder output bits in which only information of the second-stage DCI is reflected may be punctured.

3. Method 3: Method of performing rate matching by assigning higher priority to encoder output bits for second-stage DCI Method 3 may be applied to the case where second-stage DCI has higher importance than that of first-stage DCI. According to method 3, when repetition is required, encoder output bits including information of the second-stage DCI are repeated. When puncturing is required, some of encoder output bits in which only information of the first-stage DCI is reflected may be punctured.

The foregoing details may be implemented by hardware.

Figure 13:
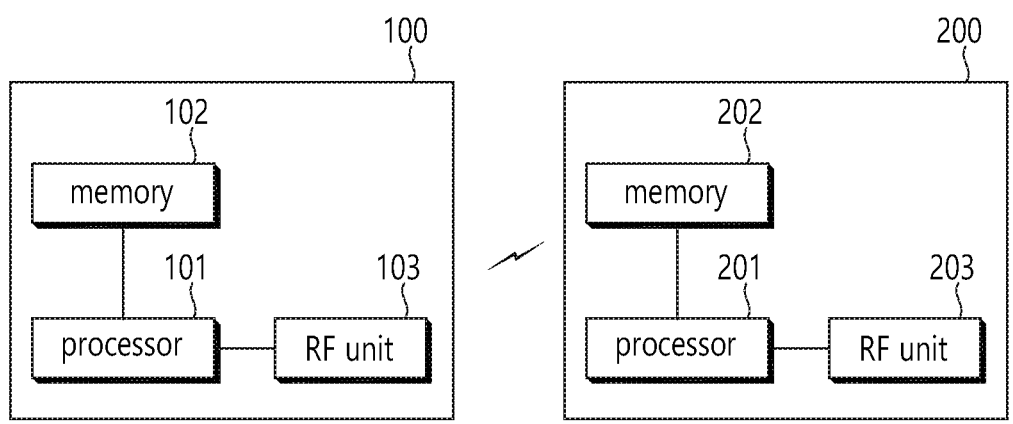
FIG. 13 is a block diagram illustrating a wireless communication system in accordance with one embodiment of the disclosure.

FIG. 13 is a block diagram illustrating a wireless communication system according to an embodiment of the disclosure.

A base station 200 includes a processor 201, a memory 202, and a radio frequency (RF) unit 203. The memory 202 is connected to the processor 201 and stores various pieces of information for driving the processor 201. The RF unit 203 is connected to the processor 201 and transmits and/or receives a radio signal. The processor 201 implements a proposed function, process, and/or method. In the foregoing embodiments, the operation of the base station may be implemented by the processor 201.

A terminal 100 includes a processor 101, a memory 102, and an RF unit 103. The memory 102 is connected to the processor 101 and stores various pieces of information for driving the processor 101. The RF unit 103 is connected to the processor 101 and transmits and/or receives a radio signal. The processor 101 implements a proposed function, process, and/or method. In the foregoing embodiments, the operation of the wireless device may be implemented by the processor 101.

The processors may include an application-specific integrated circuit (ASIC), a different chipset, a logic circuit, and/or a data processor. The memories may include a read-only memory (ROM), a random access memory (RAM), a flash memory, a memory card, a storage medium, and/or another storage device. The RF units may include a baseband circuit for processing a radio signal. When an embodiment is implemented with software, the foregoing techniques may be implemented with a module (process or function) that performs the foregoing functions. The module may be stored in the memories and may be executed by the processors. The memories may exist inside or outside the processors and may be connected to the processors via various well-known devices.

In the above illustrated systems, although the methods have been described on the basis of the flowcharts using a series of steps or blocks, the disclosure is not limited to the sequence of the steps, and some of the steps may be performed in different steps and different sequences from mentioned above or may be performed simultaneously. Furthermore, those skilled in the art will understand that the steps shown in the flowcharts are not exclusive and may include other steps or one, or more steps of the flowcharts may be deleted without affecting the scope of the present invention.

What is claimed is:

1. A method for performing channel coding on information based on a polar code, the method comprising:
    performing the channel coding on first input information, second input information and third input information based on a generator matrix for the polar code;
    transmitting, to a first terminal and a second terminal, first output information generated as a result of the channel coding, through a first physical downlink control channel (PDCCH) related to a first transmission block (TB);
    transmitting, to the first terminal, second output information generated as a result of the channel coding, through a second PDCCH related to a second TB; and
    transmitting, to the second terminal, third output information generated as a result of the channel coding, through a third PDCCH related to a third TB,
    wherein the first output information is generated based on the first input information,
    wherein the second output information is generated based on both the first output information and the second input information,
    wherein the third output information is generated based on both the first output information and the third input information, and
    wherein an aggregation level related to the first TB is determined based on a channel condition of a terminal having a poor channel condition among the first terminal and the second terminal.

2. The method of claim 1, wherein the performing of the channel coding comprises encoding the first input information based on a first polar code encoder and encoding the second input information based on a second polar code encoder.

3. The method of claim 2, wherein, based on that the first polar code encoder and the second polar code encoder have different sizes, the second output information is generated by changing a size of the first output information to a size of the second polar code encoder.

4. The method of claim 2, wherein, based on that the first polar code encoder and the second polar code encoder have a same size, the second output information is generated based on the first output information and the second input information without size matching.

5. The method of claim 1, wherein the generator matrix is generated based on a Kronecker product of a kernel matrix.

6. The method of claim 1, wherein a size and a position of an unfrozen bit are determined based on a size of the first input information and a size of the second input information.

7. A transmission device for performing channel coding on information based on a polar code, the transmission device comprising:

a transceiver configured to:
transmit, to a first terminal and a second terminal, first output information generated as a result of the channel coding, through a first physical downlink control channel (PDCCH) related to a first transmission block (TB);
transmit, to the first terminal, second output information generated as a result of the channel coding, through a second PDCCH related to a second TB; and
transmit, to the second terminal, third output information generated as a result of the channel coding, through a third PDCCH related to a third TB; and
a processor configured to:
control the transceiver; and
perform the channel coding on first input information, second input information and third input information based on a generator matrix for the polar code,
wherein the first output information is generated based on the first input information,
wherein the second output information is generated based on both the first output information and the second input information,
wherein the third output information is generated based on both the first output information and the third input information, and
wherein an aggregation level related to the first TB is determined based on a channel condition of a terminal having a poor channel condition among the first terminal and the second terminal.

* * * * *